(12) United States Patent
Jakob et al.

(10) Patent No.: US 7,312,272 B2
(45) Date of Patent: Dec. 25, 2007

(54) FOOD COATING SUBSTANCE CONTAINING A SOFTENER-FREE AQUEOUS COPOLYMER POLY(VINYL ESTER) DISPERSION, PRODUCTION AND USE THEREOF

(75) Inventors: Martin Jakob, Kelkheim (DE); Heinrich Harrer, Kriftel (DE)

(73) Assignee: Celanese Emulsions GmbH (DE)

( * ) Notice: Subject to any disclaimer, the term of this patent is extended or adjusted under 35 U.S.C. 154(b) by 0 days.

(21) Appl. No.: 10/499,503

(22) PCT Filed: Dec. 23, 2002

(86) PCT No.: PCT/EP02/14709

§ 371 (c)(1),
(2), (4) Date: Jan. 6, 2005

(87) PCT Pub. No.: WO03/054041

PCT Pub. Date: Jul. 3, 2003

(65) Prior Publication Data

US 2005/0107515 A1     May 19, 2005

(30) Foreign Application Priority Data

Dec. 21, 2001 (DE) ................. 101 63 586

(51) Int. Cl.
*C08J 3/00* (2006.01)
*C08L 33/00* (2006.01)

(52) U.S. Cl. ............... 524/503; 524/803; 524/459; 524/501; 524/522; 524/523; 524/524

(58) Field of Classification Search ........... 524/459, 524/501, 503, 522, 523, 524, 803
See application file for complete search history.

(56) References Cited

U.S. PATENT DOCUMENTS

| | | | | |
|---|---|---|---|---|
| 2,849,319 A | * | 8/1958 | Weinmann et al. ......... 426/125 |
| 4,156,047 A | * | 5/1979 | Wysong ...................... 428/220 |
| 4,350,788 A | * | 9/1982 | Shimokawa et al. ........ 524/309 |
| 4,521,561 A | * | 6/1985 | Hausman et al. ........... 524/459 |
| 4,694,056 A | * | 9/1987 | Lenney ....................... 526/202 |
| 5,110,856 A | * | 5/1992 | Oyamada et al. ........... 524/459 |
| 5,635,566 A | * | 6/1997 | Gerharz et al. ............. 525/291 |
| 5,679,735 A | * | 10/1997 | Geissler et al. ............. 524/459 |
| 5,889,107 A | * | 3/1999 | Jakob et al. ................. 524/783 |
| 5,907,011 A | * | 5/1999 | Jakob et al. ................. 524/524 |
| 5,969,065 A | * | 10/1999 | Jakob ......................... 526/208 |
| 2002/0002306 A1 | * | 1/2002 | Kadowaki et al. .......... 562/591 |

FOREIGN PATENT DOCUMENTS

| | | |
|---|---|---|
| DE | 1 236 310 | 3/1967 |
| DE | 81 309 | 4/1971 |
| DE | 197 39 190 | 3/1998 |
| EP | 0 167 477 | 1/1986 |
| EP | 0 986 965 | 3/2000 |
| GB | 1044610 | 10/1966 |
| RU | 507299 A * | 5/1976 |
| RU | 799702 A * | 1/1981 |
| SU | 897199 | 1/1982 |
| SU | 1722381 | 3/1992 |

OTHER PUBLICATIONS

The Mowilith-Handbuch [Mowility manual] from Hoechst AG (5th edition, chapter 6.8), pp. 200-203 (1970).
Donescue, D., et al., "Semicontinuous Emulsion Polymerization of Vinyl Acetate, part II. Copolymerization with Dibutyl Maleate", J. Macromol. Sci. Chem. A22:941-954 (1985).

* cited by examiner

*Primary Examiner*—David W. Wu
*Assistant Examiner*—Michael Bernshteyn
(74) *Attorney, Agent, or Firm*—Connolly Bove Lodge & Hutz LLP

(57) ABSTRACT

A novel food coating substance comprising a plasticizer-free aqueous copolymer poly(vinyl ester) dispersion of emulsion polymer, emulsifier, protective colloid and optionally other stabilizers is outstandingly suitable for the surface treatment or surface coating of hard cheese or semi-hard cheese, but also of meat products, fruits, nuts or seed material.

25 Claims, No Drawings

FOOD COATING SUBSTANCE CONTAINING A SOFTENER-FREE AQUEOUS COPOLYMER POLY(VINYL ESTER) DISPERSION, PRODUCTION AND USE THEREOF

The present invention relates to improved plastics dispersions based on copolymer poly(vinyl ester)s for coating foods, which plastics dispersions are suitable in particular as antimicrobially finished aids for cheese ripening.

The use of plastics dispersions, in particular based on homopolymer or copolymer poly(vinyl ester)s, in particular poly(vinyl acetate), for coating hard cheese has long been known. The surface treatment and subsequent drying of the dispersion generates an air-permeable water vapor barrier film which prevents both mold formation on the cheese and excessively rapid drying of the cheese loaf during ripening. During the ripening process the cheese is passed through a several-month storage period in moist rooms. Unwanted growth of microorganisms is counteracted here by an antimicrobial finish of the dispersions with special biocides, as described for example in EP-A-0 986 965. Usually, for transport to the final customer, the cheese loaf is coated for protection with paraffin-based waxes. Coatings based upon homopolymer or copolymer poly(vinyl ester)s must therefore additionally exhibit adequately high adhesion to such wax coatings that must not be detachable by normal mechanical treatment.

As a base for such food coating substances, in addition to other systems, dispersions based on homopolymer or copolymer poly(vinyl acetate) have long been proven in use.

The Mowilith-Handbuch [Mowilith manual] from Hoechst AG (5th edition, 1970, chapter 6.8, pp. 201ff.) already mentions for this field of use the homopolymer dispersion ®Mowilith D approximately 50% strength and also the copolymer dispersion ®Mowilith DM 2 KL approximately 45% strength. The latter according to the relevant product information is a plasticizer-free dispersion of copolymers of vinyl acetate with dibutyl maleate.

DD-A-81 308 describes a cheese coating substance based on 97% by weight of a poly(vinyl acetate) homopolymer dispersion, 2% by weight of sorbic acid and 1% by weight of ammonia for coating diverse hard cheese varieties. Owing to excessive brittleness of the film and the existing weakness, cheese coating substances based on unplasticized poly(vinyl ester)s, however, play only a minor role on the market.

DE-A 12 36 310 describes cheese coating dispersions of poly(vinyl acetate) in which 10 to 50% by weight of poly(vinyl propionate) is used as soft copolymer as a replacement for current external plasticizers, for example dibutyl phthalate, which are problematic under food regulations. These blends have likewise not established themselves on the market.

Derwent Abstract No. 1982-97080E, which relates to SU-B-897 199, describes a protective coat for hard cheese based on a copolymer dispersion of vinyl acetate and di-n-butyl maleate which comprises 1 to 10% by weight of glycerol triacetate.

Derwent Abstract No. 1993-074298, which is based on SU-A-17 22 381, discloses a copolymer dispersion of vinyl acetate, dibutyl maleate and acrylic acid which has enhanced keeping quality and adhesion to the cheese. These compositions additionally comprise 3 to 5% by weight of glycerol triacetate. The use of this plasticizer, however, is a problem owing to food regulations in many countries which in principle do not permit the use of plasticizers for food contact.

Copolymer dispersions of vinyl esters, in particular vinyl acetate and alkyl esters of maleic acid, in particular with the industrially important dibutyl maleate, are likewise used in numerous other fields of application, for example in the field of adhesives.

There are numerous examples in which, in the production of these dispersions, for reasons of stability or to establish specific product properties, combinations of mixed stabilizer systems consisting of protective colloids, for example poly(vinyl alcohol) and/or modified starches or celluloses, firstly, and also surface-active substances, secondly, are used. On the other hand, the type and amount of the various types of stabilizers and their interaction must be taken into account with regard to important service properties, such as water vapor permeability and also, in particular, the water absorption of the films and the wax adhesion, which are fundamental for the suitability of a cheese coating substance used for ripening of hard cheese. The type and amount of the stabilizers used therefore critically affects the behavior of the cheese coating substance on the coated cheese.

The emulsion copolymerization of vinyl esters with alkyl maleates, according to the specialist literature, is a considerably complex process. The stabilizers used in the reaction mixture exert a great effect on the course of the reaction, whether it be via distribution phenomena between the monomers already present in the reactor and newly fed into the reactor, by affecting the rates of initiator decomposition, or via chain transfer to the stabilizers. Also, agglomeration of particles during the reaction is observed, which can be interpreted, for example as a consequence of a temporarily low emulsifier concentration, in the event of oscillation of conversion (see J. Macromol. Sci. Chem. A22, 941-954 [1985]).

This particle agglomeration exerts a great effect on the viscosity and rheology of the products, leads to poor reproducibility of the results and, in extreme cases, can lead to colloidal instability. In the coalesced film, relatively large agglomerated particles, as scattering centers, reduce the proportion of reflected light and as a result decrease its glossiness. An important service property of the dispersions for cheese coating substances, however, is high film glossiness which first gives the cheese loaves an attractive visual presentation and thus increases their retail value.

Before applying the finished cheese coating substance, biocides, food colorants and other aids are added to the dispersion for formulation. In these process steps, it is advantageous for the manufacturer of the food coating substances that excessive viscosity drop does not occur during the formulation step occurring under stirring. The viscosity drop due to thixotropic Theological behavior is for the most part based on the destruction of aggregated dispersion particles as a result of shear stress. This circumstance is also disadvantageous later during the coating of the cheese loaf using special application machinery. In addition, during transfer and/or pumping operations, an unwanted viscosity decrease can also occur, or else during transport even in the tank truck.

On account of the dilution loss during formulation of the crude cheese coating dispersion to give the cheese coating substances with their additives, on the other hand, a high initial viscosity, however, is desirable, preferably greater than 10 000 mPa·s. This can be set only under great limitations by the molecular weights of polymeric stabilizers. Essentially, the viscosity is set by the presence of agglomerated particles. This property, on the other hand, however, leads in turn to decreased glossiness and increased shear instability. No satisfactory starting points have been found in the prior art to optimize these inherently contrary properties in substances for coating foods, in particular cheese.

DE-A 197 39 190, in exemplary embodiment b), discloses the production of a copolymer dispersion comprising vinyl acetate and dibutyl maleate. The stabilizer system used is exclusively poly(vinyl alcohol) of degree of hydrolysis 88 mol %. The advantage of these systems is high glossiness (with good blocking resistance) of the films. These are adhesives, for example gumming adhesives, and the use of the dispersion as food coating substance is not mentioned in this publication.

The object therefore underlying the invention was to provide an improved dispersion as a base for antimicrobially finished aids for cheese ripening based on a copolymer of vinyl esters and dialkyl esters of maleic or fumaric acid which are distinguished from conventional products, while maintaining high viscosity, by a markedly improved film glossiness and simultaneously an improved shear stability. Furthermore, the coating produced with the dispersion is also to have a water absorption as low as possible and good wax adhesion.

Surprisingly it has now been found that this object is achieved by a plasticizer-free copolymer poly(vinyl ester) dispersion which is produced by means of a mixed stabilizer system which comprises at least one emulsifier, at least two poly(vinyl alcohol)s of differing degrees of saponification and optionally other stabilizers.

The present invention thus relates to a food coating substance comprising a plasticizer-free aqueous copolymer poly(vinyl ester) dispersion which comprises A) 100 parts by weight of a copolymer of 40 to 95% by weight of vinyl esters of aliphatic saturated carboxylic acids, preferably fatty acids of a chain length of $C_1$-$C_{18}$, in particular vinyl acetate, 5 to 60% by weight of maleic esters and/or fumaric esters of monohydric aliphatic alcohols of a chain length of $C_1$-$C_{18}$, in particular dibutyl maleate and/or fumarate, and optionally other comonomers, B) 0.1 to 1.0 part by weight of an emulsifier, preferably a nonionic emulsifier, C) 1 to 12, preferably 3 to 8, parts by weight of a mixture of at least two poly(vinyl alcohol)s, consisting of at least 0.1 part by weight of at least one poly(vinyl alcohol) of a degree of hydrolysis of 85 to 90 mol % and also at least 0.1 part by weight of at least one poly(vinyl alcohol) of a degree of hydrolysis of greater than 90 mol %, preferably 90.5 to 94 mol %, and D) optionally other stabilizers.

The present invention further relates to the use of a plasticizer-free aqueous copolymer poly(vinyl ester) dispersion comprising A) 100 parts by weight of a copolymer of 40 to 95% by weight of vinyl esters of aliphatic saturated carboxylic acids, preferably fatty acids of a chain length of $C_1$-$C_{18}$, in particular vinyl acetate, 5 to 60% by weight of maleic esters and/or fumaric esters of monohydric aliphatic alcohols of a chain length of $C_1$-$C_{18}$, in particular dibutyl maleate and/or fumarate, and optionally other comonomers, B) 0.1 to 1.0 part by weight of an emulsifier, preferably a nonionic emulsifier, C) 1 to 12, preferably 3 to 8, parts by weight of a mixture of at least two poly(vinyl alcohol)s, consisting of at least 0.1 part by weight of at least one poly(vinyl alcohol) of a degree of hydrolysis of 85 to 90 mol % and also at least 0.1 part by weight of at least one poly(vinyl alcohol) of a degree of hydrolysis of greater than 90 mol %, preferably 90.5 to 94 mol %, and D) optionally other stabilizers in food coating substances.

The vinyl esters of the copolymer of aliphatic saturated carboxylic acids of chain length $C_1$-$C_{18}$ are, for example, vinyl formate, vinyl acetate, vinyl propionate, vinyl butyrate, vinyl isobutyrate, vinyl pivalate, vinyl 2-ethylhexanoate, vinyl esters of a-branched carboxylic acids having 9 or 11 carbon atoms in the acid group (®Versatic acids), the vinyl esters of lauric, palmitic, myristic and stearic acids. The content of these vinyl esters in the polymer is at least 40% by weight, preferably at least 50% by weight.

The use of vinyl esters of aliphatic fatty acids is preferred, and among these in particular vinyl acetate. Said vinyl esters can also be present simultaneously in the poly(vinyl ester).

The maleic and fumaric esters of the copolymer of monohydric aliphatic alcohols of chain length $C_1$-$C_{18}$ are those of saturated alcohols of chain length $C_1$-$C_{18}$ or those with monohydric aliphatic unsaturated alcohols of chain length $C_3$-$C_{18}$, but preferably those with saturated alcohols of chain length $C_4$-$C_8$, in particular dibutyl maleate or di-2-ethylhexyl maleate and/or di-2-ethylhexyl fumarate, in addition the esters of aliphatic carboxylic acids of chain length $C_3$-$C_{12}$ with unsaturated alcohols of chain length $C_3$-$C_{18}$, or esters of unsaturated aliphatic dicarboxylic acids with polyethylene glycols and/or polypropylene glycols. The content of this monomer group, optionally in combination with other comonomers, is 5 to 60% by weight, preferably 20 to 50% by weight.

The use of dibutyl maleate and/or dibutyl fumarate is particularly preferred.

Other comonomers which can be used in the copolymer comprise the acrylic and methacrylic esters of monohydric aliphatic saturated alcohols and ether alcohols of chain length $C_1$-$C_{18}$, vinyl chloride, vinylidene chloride, acrylonitrile and methacrylonitrile, ethylene, butadiene, isoprene, isobutylene, propylene, $C_{14}$-$C_{16}$ alpha olefins, 2-chlorobutadiene, 2,3-dichlorobutadiene, tetrafluoroethylene, styrene, vinyl ethers of monohydric aliphatic saturated alcohols of chain length $C_1$-$C_{18}$, acrylic acid, methacrylic acid, crotonic acid, maleic acid, fumaric acid, itaconic acid, vinylsulfonic acid, styrenesulfonic acid, half esters of maleic or fumaric acid and of itaconic acid with monohydric aliphatic saturated alcohols of chain length $C_1$-$C_{18}$ and also their alkali metal and ammonium salts, vinylpyrrolidone, amides of acrylic and methacrylic acid and N-methylolamides of acrylic and methacrylic acid and also ethers thereof, N-vinyl-N-methylacetamide, acrylic esters of diethylaminoethanol and/or methacrylic esters of dimethylaminoethanol, acrylic and methacrylic esters of dihydric aliphatic alcohols of chain length $C_2$-$C_{18}$, divinyl and diallyl esters of saturated and unsaturated aliphatic dicarboxylic acids of chain length $C_3$-$C_{18}$, vinyl and allyl esters of acrylic acid and crotonic acid, triallyl cyanurate and sodium 2-sulfoethyl methacrylate. Preference is given as further comonomers to ethylene, the acrylic esters of monohydric aliphatic saturated alcohols of chain length $C_4$-$C_8$ or $C_{14}$-$C_{16}$ alpha olefins.

Preferably, however, in addition to the two abovementioned groups of vinyl esters and maleates, no further comonomers are used.

Suitable emulsifiers are sodium salts, potassium salts and ammonium salts of unbranched aliphatic carboxylic acids of chain length $C_{12}$-$C_{20}$, sodium hydroxyoctadecanesulfonate, sodium salts, potassium salts and ammonium salts of hydroxy fatty acids of chain length $C_{12}$-$C_{20}$ and their sulfonation and acetylation products, alkyl sulfates, also as triethanolamine salts, alkyl ($C_{10}$-$C_{20}$)-sulfonates, alkyl($C_{10}$-$C_{20}$)-arylsulfonates, dimethyldialkyl($C_8$-$C_{18}$)-ammonium chloride, acyl, alkyl, oleyl and alkylaryl ethoxylates and their sulfonation products, alkali metal salts of sulfosuccinic esters with aliphatic saturated monohydric alcohols of chain length $C_4$-$C_{16}$, 4-esters of sulfosuccinic acid with polyethylene glycol ethers of monohydric aliphatic alcohols of chain length $C_{10}$-$C_{12}$ (disodium salt), 4-esters of sulfosuccinic acid with polyethylene glycol nonylphenyl ether (disodium salt), sulfosuccinic acid biscyclohexyl ester (sodium salt), lignosulfonic acid and its calcium, magnesium, sodium and ammonium salts, polyoxyethylene sorbitan monooleate containing 20 ethylene oxide groups, oleoresin acids, hydrogenated and dehydrogenated oleoresin acids and their alkali metal salts, sodium dodecyl diphenyl ether disulfonate and also copolymers of ethylene oxide and propylene oxide having a minimum content of 10% by weight of ethylene oxide. Preference is given to use as emulsifiers of: sodium lauryl sulfate, sodium lauryl ether sulfate, ethoxylated (3 ethylene oxide groups); the polyethylene glycol (4-20) ethers of oleyl alcohol, and also the polyethene oxide (4-14) ethers of nonylphenol.

Those which are suitable in particular are the nonionic emulsifiers, more precisely the polyethene oxide (4-20) ethers of oleyl alcohol. These compounds are used from 0.1 to 1.0% by weight, based on the amount of the total monomers, preferably 0.2 to 0.85% by weight, and particularly preferably 0.35 to 0.7% by weight.

At least one of the poly(vinyl alcohol)s used has a degree of hydrolysis of 85 to 90 mol % and viscosities of the 4% strength by weight aqueous solutions at 20° C. of 2 to 70 mPa·s.

At least one other poly(vinyl alcohol) used has a degree of hydrolysis of greater than 90 mol %, more precisely preferably 90.5 to 94 mol % and viscosities of the 4% strength by weight aqueous solutions at 20° C. of 2 to 70 mPa·s.

The poly(vinyl alcohol) acts as protective colloid. Its total amount is 1 to 12% by weight, based on the mass of the total monomers. Preferably, the amount used is 2 to 10% by weight, and particularly preferably 3 to 8% by weight.

Further suitable stabilizers for preparing the dispersion are methyl celluloses, hydroxyethyl and propyl celluloses and sodium carboxymethyl cellulose. These can be co-used in principle for matching specific properties, such as glossiness and water vapor permeability, and also for enhancing stability. This group of compounds covers gelatin, casein, starch, gum arabic, hydroxyethyl starch, sodium alginate, lactose, silicon dioxide and homo- or copolymers of the polymers used for preparing the copolymer, or their water-soluble salts, for example polyacrylic acid and polyvinylpyrrolidone. These compounds, just like the polyvinyl alcohol used and the cellulose ethers, can also be used as thickener and can be added after termination of the polymerization to set a suitable application viscosity.

Preferably, no other stabilizer is used or added during the polymerization.

A preferred embodiment of the invention is a plasticizer-free aqueous copolymer poly(vinyl ester) dispersion as constituent of a food coating substance comprising:

A) 100 parts by weight of a copolymer of 40 to 95% by weight of vinyl acetate and 5 to 60% by weight of dibutyl maleate and/or fumarate and optionally other comonomers, B) 0.35 to 0.7 part by weight of an ethoxylated oleyl alcohol,
C) 3 to 8 parts by weight of a mixture of poly(vinyl alcohol)s, consisting of at least 0.1, preferably at least 2, parts by weight of at least one poly(vinyl alcohol) and a degree of hydrolysis of 85 to 90 mol % and also
at least 0.1, preferably at least 1, part by weight of at least one poly(vinyl alcohol) of a degree of hydrolysis of 90.5 to 94 mol %.

The solids content of the dispersion is 20 to 65% by weight, preferably 30 to 60% by weight, and particularly preferably 40 to 55% by weight.

The dispersions to be used according to the invention are preferably produced by free-radical emulsion polymerization. The polymerization can be carried out in the batch process, in the feed stream process, or in the combined batch/feed stream process. Preferably, however, the feed stream process is employed, customarily a part of the monomers (1 to 15% by weight) being charged to initiate the polymerization.

The initiators used are, for example: hydrogen peroxide, benzoyl peroxide, cyclohexanone peroxide, isopropylcumyl hydroperoxide, persulfates of potassium, sodium and ammonium, peroxides of even numbered saturated monohydric aliphatic carboxylic acids of chain length $C_8$-$C_{12}$, tertiary-butyl hydroperoxide, ditertiary-butyl peroxide, diisopropyl percarbonate, azoisobutyrodinitrile, acetylcyclohexanesulfonyl peroxide, tertiary-butyl perbenzoate, tertiary-butyl peroctoate, bis(3,5,5-trimethyl)hexanoyl peroxide, tertiary-butyl perpivalate, hydroperoxypinane, p-methane hydroperoxide. The abovementioned compounds can also be used within a redox system, in which case transition metal salts such as iron(II) sulfate or other reducing agents can be used in conjunction. Reducing agents or regulators which can be used in conjunction are alkali metal salts of oxymethanesulfinic acid, mercaptans of chain length $C_{10}$-$C_{14}$, but-1-en-3-ol, hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

Preferably, however, water-soluble persulfates, in particular ammonium persulfate or sodium persulfate, are used to initiate the polymerization.

After completion of the polymerization, to remove monomers, a further aftertreatment can follow, preferably with redox catalysts, for example combinations of oxidizing agents with reducing agents such as ascorbic acid.

At the end, further aids may be added to the dispersion. This group covers, for example, said stabilizers. Suitable additives are stabilizers such as neutralizing agents and complexing agents. Those which may be mentioned by way of example are hydroxides, carbonates and phosphates of alkali metals, ammonium and calcium, alkali metal salts of ethylenediaminetetraacetic acid and N-hydroxyethylethylenediaminetriacetic acid, citric acid, and also sodium acetate and phosphoric acid, ammonium chloride, sodium sulfate, homopolymer of 2-acrylamido-2-methylpropanesulfonic acid and its sodium, potassium and ammonium salts, and also substances for protecting the dispersion from microbial infection. Preferably, use is made of preservatives which are permitted in the relevant regulations on provisions under food law for additives in cheese.

To adjust the dispersion to give the finished cheese coating substance, the colorants permitted in the relevant positive lists can be used, such as carotene (E 160a), annato (E 160b), vegetable carbon (E 153), titanium dioxide (E 171), tartrazine (E 102), quinoline yellow (E 104), sunset yellow FCF (E 110), cochineal red A (E 124), indigotine (E 132), brilliant black BN (E 151) or litholrubine BK (E 180).

A particularly preferred selection of the raw materials used for producing the dispersion and for formulation corresponds to the guidelines of the Netherlands Good Evaluation B.1.4 and/or the "XIV. Empfehlung, Teil B der BGVV" [Recommendation XIV, Part B of the Federal German Institute for Consumer Health Protection and Veterinary Medicine].

The inventive dispersions, compared with conventional products, exhibit, while maintaining high viscosity, a markedly improved film glossiness and at the same time an improved shear stability. They are especially suitable as constituent for producing food coating substances, in particular as an aid for ripening hard cheese, but also for coating other foods, for example fruits, nuts and meat products and seed material.

The examples hereinafter serve to illustrate the invention. Data on parts and percentages are based on the weight, unless stated otherwise.

EXAMPLE 1

Production of a Dispersion for an Inventive Food Coating Substance

In a cylindrical glass stirred kettle reactor having heating/cooling bath, anchor agitator, metering apparatuses and reflux condenser, 4.1 parts of PVA BP-28 (partially saponified polyvinyl alcohol from Chang-Chun Petrochemical Co., Ltd. of a degree of hydrolysis 86-89 mol % and a mean viscosity of 60-70 mPa·s, measured in 4% strength aqueous solution at 20° C.) and also 2.9 parts of ®Mowiol 30-92 (highly saponified polyvinyl alcohol of a degree of hydrolysis of 91.5-93.3 mol % and a mean viscosity of 28-32 mPa·s, measured in 4% strength aqueous solution) and also 0.5 part of ®Genapol 0-200 (ethoxylated oleyl alcohol from Clariant GmbH of a mean degree of ethoxylation of 20 mol of ethylene oxide), together with 0.11 part of anhydrous sodium acetate were suspended in 112 parts of deionized water and then dissolved at a temperature of at least 80° C. This solution was cooled overnight to room temperature. Before polymerization, 0.11 part of glacial acetic acid were added and the experimental batch was heated. At 65° C., 5.7% of a total of 100 parts of monomer mixture, consisting of 70 parts of vinyl acetate and 30 parts of di-n-butyl maleate were added in the course of 10 min to initiate the polymerization. The reaction was started by adding 0.2 part of ammonium peroxodisulfate in 2.05 parts of deionized water. After the initiation of polymerization (approximately 15 minutes), the remaining monomer mixture was added in the course of 3.5 hours, at the same time a solution of 0.06 part of ammonium peroxodisulfate in 5.7 parts of water being metered in parallel. The reaction temperature was held during this time at 70 to 72° C. After the end of the feeds, 0.06 part of ammonium peroxodisulfate in 5.7 parts of water were added and then the mixture was further polymerized up to approximately 90° C. for 1 hour. To reduce the residual monomers, in the cooling phase, the mixture was further polymerized by adding 0.1 part of 30% strength hydrogen peroxide (at 80° C.) and 0.26 part of ascorbic acid (at 75° C.). To set a pH of 4.5, 1.7 parts of 10% strength sodium hydroxide solution were further added to the finished dispersion at room temperature. This produced a coagulate-free dispersion of a solids content of 45%, a residual vinyl acetate content of 0.12%, a viscosity of 16 100 mPa·s (Brookfield RVT, spindle 6, 20 rpm, 23° C.).

COMPARATIVE EXAMPLES C1 TO C3

In accordance with the above procedure, dispersions were likewise produced in the target viscosity range of 15 000 to 20 000 mPa·s and a solids content of 45%, but using other stabilizer combinations. The materials used and the measured data of the dispersions are compiled in table 1. The residual vinyl acetate contents were <0.15% in all cases.

TABLE 1

| Example | Stabilizer system | Viscosity (Brookfield RVT) |
|---|---|---|
| 1 | 4.1 GT PVA BP28<br>2.9 GT Mowiol 30-92[1)]<br>0.5 GT Genapol O-200 | 16 100 mPa · s |
| C1 | 4.1 GT PVA BP-28<br>2.9 GT Mowiol 30-92 | 18 100 mPa · s |
| C2 | 3.5 GT Mowiol 40-88<br>3.5 GT Mowiol 26-88<br>0.5 GT Genapol O-200 | 16 400 mPa · s |
| C3 | 2 GT Mowiol 40-88<br>5 GT Mowiol 26-88 | 15 600 mPa · s |

[1)] ® Mowiol is the trade name for polyvinyl alcohol of Clariant GmbH. The nomenclature "XX-YY" denotes with XX the viscosity of the 4% strength aqueous solution at 20° C. in mPa·s, and with YY, the mean degree of hydrolysis in mol %.

Methods Used to Test Performance Properties for Evaluation as Food Coating Substance Measurement of Film Glossiness Film glossiness was measured using a Dr. Lange laboratory reflectometer RL 3 from Dr. Bruno Lange GmbH. The test samples were applied to a glass plate with a wet layer thickness of 300 µm using an Erichsen applicator and then dried at room temperature for 24 hours. The laboratory reflectometer is first calibrated using calibration standard A (polished, high-gloss black glass plate). The measuring head of the reflectometer is placed onto the surface of the test sample and the measurement started. The reflectometer measures successively at different angles of incidence. The measurement is carried out as triplicate determination at three different places on the surface under test and the arithmetic mean is calculated. The results of the measurements were evaluated at 20° angle of incidence, the mean scale divisions of which are reported.

Determining Shear Stability in the Rapid Mixer Test

Approximately 400 g of the dispersion under test, of which the viscosity has been measured in advance at 23° C., are placed in a 500 ml PE wide neck bottle with screw closure. The closure is provided with a hole through which is passed the agitator used (propeller agitator, three-vane, approximately 45 mm). The dispersion is agitated for 2 hours at 2000 rpm using an IKA laboratory stirrer RW 20 D2M stirrer motor. The dispersion is then cooled to 23° C. in the course of 2 hours, the viscosity is measured and the viscosity is measured again after 24 hours. The percentage decrease in viscosity is determined as follows:

% viscosity decrease=[initial viscosity−final viscosity after 24 h]/[initial viscosity]·100

Wax Adhesion Test

The films are produced by casting 80 g of a dispersion, admixed with food additive E 160b (commercial product of CSK Food Enrichment N.V.) and diluted to 14% solids through a gauze onto a metal plate which is provided with a rim and has a surface area of 314 cm². In this manner a dried polymer film of 300 µm thickness is formed. From this film, a round film piece having a diameter of 60 mm is cut out and conditioned for a period of 48 h at a temperature of 23° C. and at 50% relative humidity. The resultant film piece is used to seal a glass cylinder provided with a metal flange and into which 0.5 g of water had been weighed in advance. Thereafter, the upper side of the film is given a 4 mm thick coating of completely molten yellow wax (®Paradip Yellow B1 from Paramelt B.V.) (80° C.). After a standing time of 5 h at 23° C. and 50% relative humidity, the composite polymer film/wax is taken off from the glass cylinder and separated by pulling apart by hand. The adhesion is assessed according to resistance to separation:

(+)=Good adhesion with relatively severe deformation of the polymer film on separation.

(+/−)=Moderately good adhesion with moderately severe deformation of the polymer film on separation.

(−)=Relatively poor adhesion with only slight deformation of the polymer film on separation.

Water Absorption of the Films

One part of cheese coating dispersion is diluted with 2 parts of distilled water. This dilution is used to prepare a cast film from which, after it is dried for 24 hours, approximately 3×3 cm size squares of approximately 400 mg weight are cut. These film pieces are dried for 24 hours at room temperature in a vacuum drying cabinet. The dried film pieces are weighed and completely covered with distilled water so as to be free from bubbles in a covered Petri dish. After 24 hours each film piece is dried between two layers of absorbent paper and is then weighed immediately.

The water absorption in % is given from the quotient:

(Weight of the Swollen Film/Weight of the Dried Film)—100-100

TABLE 2

Results of the tests of performance properties

| Example | Film glossiness SKT | Shear stability (% viscosity decrease) | Water absorption % | Wax adhesion |
|---|---|---|---|---|
| 1 | 81 | 73.5% | 15.2% | (+) |
| C1 | 62 | 95.5% | 40.6% | (−) |
| C2 | 99 | 79.5% | 19.8% | (−) |
| C3 | 40 | 94.1% | Film reemulsified | (−) |

These examples make clear the advantageous interaction of the components in the inventive selection of stabilizers. The requirement for markedly improved film glossiness with high shear stability, that is to say low percentage viscosity decrease after stirring, is met to begin with not only by example 1, but also by comparative example 2, both of which each comprise component B) (ethoxylated fatty alcohol). The inventive example 1, compared with comparative example C2, has in addition to the poly(vinyl alcohol) of degree of hydrolysis of 88 mol %, poly(vinyl alcohol) of degree of hydrolysis of greater than 90 mol % and, with this selection, has an advantageous improvement in the properties of importance for a cheese coating substance, wax adhesion and reduced water absorption, which leads to the fact that during storage, during the ripening period on shelf bases in moist rooms, the coated hard cheese swells less from absorption of water and thus the adhesion of the cheese loaf to the board is reduced.

EXAMPLE 2 AND COMPARATIVE EXAMPLE C4

Two further dispersions were produced according to the procedure for producing the dispersion in example 1. This time only 82 parts of water were used in the charge and the monomer mixture used was 60 parts of vinyl acetate and 40 parts of dibutyl maleate. The stabilizers used were the components listed in table 3. The viscosity target range was 12 000 to 18 000 mPa·s and the solids contents 52±0.15%. Coagulate-free dispersions were obtained having residual vinyl acetate contents of <0.15%.

TABLE 3

| Example | Stabilizer system | Viscosity (Brookfield RVT) |
|---|---|---|
| 2 | 2.9 GT Mowiol 56-88<br>2.1 GT Mowiol 30-92<br>0.5 GT Genapol O-200 | 17 300 mPa · s |
| C4 | 1 GT Mowiol 40-88<br>4 GT Mowiol 26-88<br>0.5 GT Genapol O-200 | 14 800 mPa · s |

COMPARATIVE EXAMPLE C5

®Mowilith SDM 4210 KL, a dispersion marketed by Clariant GmbH for producing food coating substances with the specification range for viscosity of 12 000-18 000 mPa·s and a solids content of approximately 45%.

In addition, these products were analyzed for the mass fraction of aggregated particles based on the totality of all particles using a combined laser-scattering and diffraction instrument for determining the particle size distribution curves (Mastersizer Micro Plus from Malvern Instruments Ltd.). The results are listed in table 4.

The products were found to have the following performance properties:

TABLE 4

Results of the performance tests

| Example | Aggregate % by wt. | Film glossiness SKT | Shear stability (% viscosity decrease) | Water absorption % | Wax adhesion |
|---|---|---|---|---|---|
| 2 | 10.7% | 97 | 68.8% | 16.5% | (+) |
| C4 | 8% | 110 | 81.9% | 24.8% | (+/−) |
| C5 | 48% | 75 | 85% | 31.0% | not determined |

This tabulation makes it clear that, compared with example C5, a commercially conventional cheese coating dispersion, in example 2 (and also in comparative example C4), owing to a decreased particle agglomeration in the viscosity window from 12 000 to 18 000 mPa·s, a markedly higher level of film glossiness can be achieved. Comparative example C4 which does not contain poly(vinyl alcohol) of a degree of hydrolysis >90 mol %, but does contain ethoxylated fatty alcohol, already partially meets the performance requirements of a cheese coating dispersion, but only with the presence of all inventive components in example 2 is the advantageous property profile with high glossiness, low stirring loss, low water absorption and good wax adhesion achieved in totality.

The invention claimed is:

1. A food coating substance comprising a plasticizer-free, aqueous copolymer poly(vinyl ester) dispersion which comprises
   A) 100 parts by weight of a copolymer of 40 to 95% by weight of vinyl esters of aliphatic saturated carboxylic acids having chain lengths of $C_1$-$C_{18}$, 5 to 60% by weight of bis-esters of maleic acid with monohydric aliphatic alcohols of a chain length of C1-C18, bis-esters of fumaric acid with monohydric aliphatic alcohols of a chain length of C1-C18, or mixtures thereof, and optionally other comonomers,
   B) 0.1 to 1.0 part by weight of an emulsifier,
   C) 1 to 12, parts by weight of a mixture of at least two poly(vinyl alcohols), consisting of
      at least 0.1 parts by weight of at least one poly(vinyl alcohol) having a degree of hydrolysis of between about 85 to about 90 mol %
      and at least 0.1 parts by weight of at least one poly(vinyl alcohol) having a degree of-hydrolysis greater than about 90 mol %, and
   D) optionally other stabilizers.

2. The food coating substance comprising a plasticizer-free, aqueous copolymer poly(vinyl ester) dispersion as claimed in claim 1, wherein the vinyl esters of aliphatic saturated carboxylic acids having chain lengths $C_1$-$C_{18}$, comprises vinyl formate, vinyl acetate, vinyl propionate, vinyl butyrate, vinyl isobutyrate, vinyl pivalate, vinyl 2-ethylhexanoate, vinyl esters of α-branched carboxylic acids having 9 or 111 carbon atoms in the acid group, or vinyl esters of lauric, palmitic, myristic and stearic acids or mixtures of these.

3. The food coating substance comprising a plasticizer-free, aqueous copolymer poly(vinyl ester) dispersion as claimed in claim 1, wherein the dispersion comprises vinyl esters of aliphatic saturated carboxylic acids of chain length $C_1$-$C_{18}$ in an amount of at least 50% by weight.

4. The food coating substance comprising a plasticizer-free, aqueous copolymer poly(vinyl ester) dispersion as claimed in claim 1, wherein bis-esters of maleic acid with monohydric aliphatic alcohols of a chain length of $C_1$-$C_{18}$, bis-esters of fumaric acid with monohydric aliphatic alcohols of a chain length of $C_1$-$C_{18}$, or mixtures thereof, comprise esters of saturated alcohols of chain length $C_1$-$C_{18}$ or esters of monohydric aliphatic unsaturated alcohols of chain length $C_3$-$C_{18}$.

5. The food coating substance comprising a plasticizer-free, aqueous copolymer poly(vinyl ester) dispersion as claimed in claim 1, wherein the dispersion comprises 20 to 50% by weight of bis-esters of maleic acid with monohydric aliphatic alcohols of a chain length of C1-C18, bis-esters of fumaric acid with monohydric aliphatic alcohols of a chain length of C1-C18, or mixtures thereof, and optionally other comonomers.

6. The food coating substance comprising a plasticizer-free, aqueous copolymer poly(vinyl ester) dispersion as claimed in claim 1, wherein the emulsifier comprises sodium salts, potassium salts and ammonium salts of unbranched aliphatic carboxylic acids of chain length $C_{12}$-$C_{20}$, sodium hydroxyoctadecanesulfonate, sodium salts, potassium salts and ammonium salts of hydroxy fatty acids of chain length $C_{12}$-$C_{20}$ and their sulfonation and acetylation products, alkyl sulfates, triethanolamine salts, alkyl ($C_{10}$-$C_{20}$)-sulfonates, alkyl($C_{10}$-$C_{20}$)-arylsulfonates, dimethyldialkyl($C_8$-$C_{18}$)-ammonium chloride, acyl, alkyl, oleyl and alkylaryl ethoxylates and their sulfonation products, alkali metal salts of sulfosuccinic esters with aliphatic saturated nonylphenyl ether (disodium salt), sulfosuccinic acid biscyclohexyl ester (sodium salt), lignosulfonic acid and its calcium, magnesium, sodium and ammonium salts, polyoxyethylene sorbitan monooleate containing 20 ethylene oxide groups, oleoresin acids, hydrogenated and dehydrogenated oleoresin acids and their alkali metal salts, sodium dodecyl diphenyl ether disulfonate or copolymers of ethylene oxide and propylene oxide having a minimum content of 10% by weight of ethylene oxide, sodium lauryl sulfate, sodium lauryl ether sulfate, polyethylene glycol (4-20) ethers of oleyl alcohol, or polyethene oxide (4-14) ethers of nonylphenol.

7. The food coating substance comprising a plasticizer-free, aqueous copolymer poly(vinyl ester) dispersion as claimed in claim 1, wherein the dispersion comprises the emulsifiers in an amount in the range of from 0.2 to 0.85 parts by weight.

8. The food coating substance comprising a plasticizer-free, aqueous copolymer poly(vinyl ester) dispersion as claimed in claim 1, wherein said mixture of at least two poly(vinyl alcohols), comprises a first poly(vinyl alcohol) which has a degree of hydrolysis of 85 to 90 mol % and a viscosity of its 4% strength aqueous solution at 20° C. of 2 to 70 mPa·s, and a second poly(vinyl alcohol) which has a degree of hydrolysis in the range from 90.5 to 94 mol % and a viscosity of 4% by weight aqueous solution at 20° C. of 2 to 70 mPa·s.

9. A process for producing a plasticizer-free aqueous copolymer poly(vinyl ester) dispersion as constituent in a food coating substance as claimed in claim 1 by free-radical emulsion polymerization in which the monomers are fed in a batch process, a feed stream process, or in a combined batch/feed stream process, based on the total amount of monomers, to initiate the polymerization.

10. A process for coating a food substance which comprises coating a food with the food coating substance as claimed in claim 1.

11. The process of claim 10 wherein the food substance is hard cheese or semi-hard cheese.

12. The process of claim 10 wherein the food substance is a meat product, fruit, nut or seed material.

13. The food coating substance comprising a plasticizer-free, aqueous copolymer poly(vinyl ester) dispersion as claimed in claim 1, wherein said bis-esters of maleic acid with monohydric aliphatic alcohols of a chain length of C1-C18, bis-esters of fumaric acid with monohydric aliphatic alcohols of a chain length of C1-C18, or mixtures thereof comprise dibutyl maleate, di-2-ethylhexyl maleate, di-2-ethylhexyl fumarate, or mixtures thereof.

14. The food coating substance comprising a plasticizer-free, aqueous copolymer poly(vinyl ester) dispersion as claimed in claim 1, wherein the dispersion comprises esters of aliphatic carboxylic acids of chain length $C_3$-$C_{12}$ with unsaturated alcohols of chain length $C_3$-$C_{18}$, or esters of unsaturated aliphatic dicarboxylic acids with polyethylene glycols and/or polypropylene glycols.

15. The food coating substance comprising a plasticizer-free, aqueous copolymer poly(vinyl ester) dispersion as claimed in claim 3, wherein said bis-esters of maleic acid with monohydric aliphatic alcohols of a chain length of $C_1$-$C_{18}$, bis-esters of fumaric acid with monohydric aliphatic alcohols of a chain length of $C_1$-$C_{18}$, or mixtures thereof, comprise esters of saturated alcohols of chain length $C_1$-$C_{18}$ or esters of monohydric aliphatic unsaturated alcohols of chain length $C_3$-$C_{18}$.

16. The food coating substance comprising a plasticizer-free, aqueous copolymer poly(vinyl ester) dispersion as claimed in claim 3, wherein said bis-esters of maleic acid with monohydric aliphatic alcohols of a chain length of $C_1$-$C_{18}$, bis-esters of fumaric acid with monohydric aliphatic alcohols of a chain length of $C_1$-$C_{18}$, or mixtures thereof, comprise dibutyl maleate, di-2-ethylhexyl maleate, di-2-ethylhexyl fumarate, or mixtures thereof.

17. The food coating substance comprising a plasticizer-free, aqueous copolymer poly(vinyl ester) dispersion as claimed in claim 3, wherein the dispersion comprises esters of aliphatic carboxylic acids of chain length $C_3$-$C_{12}$ with unsaturated alcohols of chain length $C_3$-$C_{18}$, or esters of unsaturated aliphatic dicarboxylic acids with polyethylene glycols and/or polypropylene glycols.

18. The food coating substance comprising a plasticizer-free, aqueous copolymer poly(vinyl ester) dispersion as claimed in claim 17, wherein the emulsifiers, comprises sodium salts, potassium salts and ammonium salts of unbranched aliphatic carboxylic acids of chain length $C_{12}$-$C_{20}$, sodium hydroxyoctadecanesulfonate, sodium salts, potassium salts and ammonium salts of hydroxy fatty acids of chain length $C_{12}$-$C_{20}$ and their sulfonation and acetylation products, alkyl sulfates, triethanolamine salts, alkyl ($C_{10}$-$C_{20}$)-sulfonates, alkyl($C_{10}$-$C_{20}$)-arylsulfonates, dimethyl-dialkyl($C_8$-$C_{18}$)-ammonium chloride, acyl, alkyl, oleyl and alkylaryl ethoxylates and their sulfonation products, alkali metal salts of sulfosuccinic esters with aliphatic saturated monohydric alcohols of chain length $C_4$-$C_{16}$, 4-esters of sulfosuccinic acid with polyethylene glycol ethers of monohydric aliphatic alcohols of chain length $C_{10}$-$C_{12}$ (disodium salt), 4-esters of sulfosuccinic acid with polyethylene glycol nonylphenyl ether (disodium salt), sulfosuccinic acid biscyclohexyl ester (sodium salt), lignosulfonic acid and its calcium, magnesium, sodium and ammonium salts, polyoxyethylene sorbitan monooleate containing 20 ethylene oxide groups, oleoresin acids, hydrogenated and dehydrogenated oleoresin acids and their alkali metal salts, sodium dodecyl diphenyl ether disulfonate or copolymers of ethylene oxide and propylene oxide having a minimum content of 10% by weight of ethylene oxide, sodium lauryl sulfate, sodium lauryl ether sulfate, polyethylene glycol (4-20) ethers of oleyl alcohol, or polyethene oxide (4-14) ethers of nonylphenol.

19. The food coating substance comprising a plasticizer-free, aqueous copolymer poly(vinyl ester) dispersion as claimed in claim 6, wherein the dispersion comprises the emulsifiers in an amount in the range from 0.35 to 0.7 parts by weight.

20. The food coating substance comprising a plasticizer-free, aqueous copolymer poly(vinyl ester) dispersion as claimed in claim 7, wherein the mixture of at least two poly(vinyl alcohols) comprises a first poly(vinyl alcohol) which has a degree of hydrolysis of 85 to 90 mol % and a viscosity of its 4% strength aqueous solution at 20° C. of 2 to 70 mPa·s, and a second poly(vinyl alcohol) which has a degree of hydrolysis in the range from 90.5 to 94 mol % and a viscosity of 4% by weight aqueous solution at 20° C. of 2 to 70 mPa·s.

21. A process for producing a plasticizer-free aqueous copolymer poly(vinyl ester) dispersion as constituent in a food coating substance as claimed in claim 8 by free-radical emulsion polymerization in which the monomers are fed in a batch process, a feed stream process, or in a combined batch/feed stream process, based on the total amount of monomers, to initiate the polymerization.

22. The food coating substance of claim 1, wherein the emulsifier is a nonionic emulsifier.

23. A food substance coated with the food coating substance as claimed in claim 1.

24. The food substance of claim 23 wherein said food substance is hard cheese or semi-hard cheese.

25. The food substance of claim 23 wherein said food substance is a meat product, fruit, nut or seed material.

* * * * *

UNITED STATES PATENT AND TRADEMARK OFFICE
CERTIFICATE OF CORRECTION

PATENT NO. : 7,312,272 B2 Page 1 of 1
APPLICATION NO. : 10/499503
DATED : December 25, 2007
INVENTOR(S) : Martin Jakob et al.

It is certified that error appears in the above-identified patent and that said Letters Patent is hereby corrected as shown below:

In Claim 4, at column 11, line 40, please insert -- said -- between "wherein" and "bis-esters."

Signed and Sealed this

Thirteenth Day of May, 2008

JON W. DUDAS
*Director of the United States Patent and Trademark Office*